US012165668B2

(12) United States Patent
Sharma et al.

(10) Patent No.: US 12,165,668 B2
(45) Date of Patent: Dec. 10, 2024

(54) METHOD FOR NEURAL BEAMFORMING, CHANNEL SHORTENING AND NOISE REDUCTION

(71) Applicant: Microsoft Technology Licensing, LLC, Redmond, WA (US)

(72) Inventors: Dushyant Sharma, Mountain House, CA (US); James Fosburgh, Winchester, MA (US); Patrick Naylor, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 17/675,023

(22) Filed: Feb. 18, 2022

(65) Prior Publication Data

US 2023/0267944 A1 Aug. 24, 2023

(51) Int. Cl.

*G10L 21/0232* (2013.01)
*G10L 21/0208* (2013.01)
*G10L 25/84* (2013.01)

(52) U.S. Cl.

CPC .......... *G10L 21/0232* (2013.01); *G10L 25/84* (2013.01); *G10L 2021/02082* (2013.01)

(58) Field of Classification Search

CPC ................. G10L 21/0232; G10L 25/84; G10L 2021/02082; G10L 2021/02166; G10L 21/0208; G10L 704/233

See application file for complete search history.

(56) References Cited

U.S. PATENT DOCUMENTS

| | | | | |
|---|---|---|---|---|
| 11,304,000 B2 * | 4/2022 | Kinoshita | H04R 3/04 | |
| 11,894,010 B2 * | 2/2024 | Nakatani | H04R 3/00 | |
| 2002/0057734 A1 * | 5/2002 | Sandberg | H04L 25/03019 | 375/222 |
| 2003/0210742 A1 * | 11/2003 | Balakrishnan | H04L 25/03012 | 375/232 |
| 2004/0042543 A1 * | 3/2004 | Li | H04L 25/03159 | 375/222 |

(Continued)

OTHER PUBLICATIONS

Nakatani et al.; "A Unified Convolutional Beamformer for Simultaneous Denoising and Dereverberation"; IEEE Signal Processing Letters, vol. 26, No. 6, Jun. 2019, pp. 903-907.

*Primary Examiner* — Fariba Sirjani

(74) *Attorney, Agent, or Firm* — Foley IP Law, PLLC

(57) ABSTRACT

A method of performing at least de-reverberation and noise-reduction of an input sound signal of at least one input channel includes: performing, using at least one filter element, at least one of de-reverberation and noise-reduction of the input sound signal to generate a clean output sound signal; and determining, by a non-intrusive measure (NIM) estimation element, at least one non-intrusive measure (NIM) from the sound signal, wherein the at least one NIM includes at least one of voice activity detection (VAD) posterior, reverberation time, clarity index, direct-to-reverberant ratio (DRR), and signal-to-noise ratio (SNR); the de-reverberation is achieved by applying at least one channel shortening (CS) filter component of the at least one filter element in conjunction with the at least one NIM; and the noise reduction is performed in combination with the de-reverberation by the channel shortening (CS) filter component.

20 Claims, 6 Drawing Sheets

(56) References Cited

U.S. PATENT DOCUMENTS

| | | | | |
|---|---|---|---|---|
| 2005/0053127 | A1* | 3/2005 | Shiue | H04L 25/03038 375/232 |
| 2007/0297499 | A1* | 12/2007 | de Victoria | H04L 25/03133 375/232 |
| 2011/0255586 | A1* | 10/2011 | Li | H04L 25/03044 375/230 |
| 2019/0318733 | A1* | 10/2019 | Mani | G10L 21/0208 |
| 2021/0074316 | A1* | 3/2021 | Souden | G10L 15/25 |
| 2022/0068288 | A1* | 3/2022 | Nakatani | H04R 3/00 |
| 2022/0231738 | A1* | 7/2022 | Haustein | H04B 7/0408 |
| 2023/0154480 | A1* | 5/2023 | Xu | G10L 21/0264 704/270 |
| 2023/0239616 | A1* | 7/2023 | Nakatani | H04R 1/406 381/73.1 |

* cited by examiner

METHOD FOR NEURAL BEAMFORMING, CHANNEL SHORTENING AND NOISE REDUCTION

BACKGROUND OF THE DISCLOSURE

1. Field of the Disclosure

The present disclosure relates to systems and methods for sound signal processing, and relates more particularly to enhancement of speech signal(s) captured by at least one input device.

2. Description of the Related Art

When a speech signal is acquired from one or more far field microphone(s) (microphones configured to capture sound from distances of, e.g., 5 feet or more from the sound source), the speech signal often gets corrupted with additive noise and convolutive effects of room reverberation. This is true for artificial-intelligence (AI)-based automatic speech recognition (ASR) system applications, e.g., for meeting transcription. In such applications, it is desirable to provide a technique for signal enhancement, thereby enabling the ASR system to operate in a robust manner.

In an example case involving signal processing within a neural beamforming structure (multiple-channels input, single-channel output), signal processing problems include de-reverberation, de-noising and spatial filtering (beamforming). Among the currently-known beamformers, a Minimum Variance Distortionless Response (MVDR) beamformer targets de-noising. An example MVDR beamformer includes a filter-and-sum beamformer with the ability to place nulls towards competing speakers or noise. Another currently-known beamformer is a neural beamformer, which uses a neural network to optimize the beamformer parameters and can also be trained to target word error rate (WER) reduction. The neural beamformer is typically composed of a neural network estimating MVDR parameters (and thus also targets de-noising). In addition, there are known de-reverberation methods such as Channel Shortening (CS) and Weighted Prediction Error (WPE), which have been deployed as part of MVDR beamformers. Furthermore, there are a class of "convolutional beamformers" which jointly optimize the WPE and MVDR constraints. However, there is no known solution which jointly optimizes de-reverberation, de-noising and spatial filtering in an integrated manner.

Similarly, in an example case involving signal processing for a single channel input, single channel output system, there are currently no known method which jointly optimizes de-reverberation and de-noising in an integrated manner.

Therefore, a need exists for providing a solution which jointly optimizes at least de-reverberation and de-noising, as well as including spatial filtering in the joint optimization in the case of multiple-channels input, single-channel output system.

SUMMARY OF THE DISCLOSURE

According to an example embodiment of the present disclosure, a method for jointly optimizing the objectives of de-reverberation and de-noising (also referred to as noise reduction) with a neural-network-based approach is provided.

According to an example embodiment of the present disclosure, the objective of spatial filtering (also known as beamforming) is jointly optimized with the objectives of de-reverberation and de-noising (also referred to as noise reduction), using a neural-network-based approach.

According to an example embodiment of the present disclosure, a method for jointly optimizing de-reverberation, spatial filtering and de-noising for a multi-channel input, single-channel output (MISO) system is provided, which method utilizes a combination of signal quality and automatic speech recognition (ASR)-based losses for the optimization criteria.

According to an example embodiment of the present disclosure, a method for jointly optimizing de-reverberation and de-noising for a single-channel input, single-channel output (SISO) system is provided.

According to an example embodiment of the present disclosure, for the MISO system, the following are performed: i) neural delay-and-sum beamforming, ii) channel-shortening-based de-reverberation, and iii) mask-based noise reduction.

According to an example embodiment of the present disclosure, for the MISO system, the following are performed: i) CS filter estimation and noise reduction mask (NRM) estimation are performed by a CS filter estimation component using information from the spectra of all of the multiple channel inputs to configure a single CS filter and a single NRM; ii) phase shift estimation is performed (e.g., in parallel with CS filter and NRM estimation); iii) phase alignment is performed after the phase shift estimation; iv) a weight-and-sum operation is performed next; and then v) a single channel shortening (CS) filter and, optionally, a single noise-reduction mask (NRM) can be applied to the output of the weight-and-sum operation.

According to an example embodiment of the present disclosure, for the MISO system, the following are performed: i) a CS filter estimation component uses information from the spectra of all of the multiple channel inputs to configure corresponding multiple CS filters and a single NRM; ii) phase shift estimation is performed (e.g., in parallel with CS filter and NRM estimation); iii) phase alignment is performed after the phase shift estimation; iv) the output of the phase alignment is applied to the multiple CS filters; and v) a weight-and-sum operation is performed on the output of the multiple CS filters, the output of which weight-and-sum operation is a single channel signal that can be further processed by the single NRM and/or a voice activity detection (VAD) estimation component.

According to an example embodiment of the present disclosure, for the SISO system, the following are performed: i) noise reduction is performed explicitly using a time-frequency (T-F) mask; ii) de-reverberation is performed in the form of channel shortening (e.g., by applying a CS filter); and iii) voice activity estimated from the T-F mask (voice activity detection (VAD)) is used to determine the amount of speech present in a context window.

According to an example embodiment of the present disclosure, for the SISO system, noise reduction is performed explicitly to find the reverberant-only signal before performing channel shortening.

According to an example embodiment of the present disclosure, for the SISO system, after performing channel shortening to produce estimated de-reverberated and noisy speech, noise reduction is performed on the estimated de-reverberated and noisy speech.

According to an example embodiment of the present disclosure, for the SISO system, the multiplicative factors for channel shortening and noise reduction are estimated jointly as one filter, whereby noise reduction is performed implicitly in combination with the channel shortening filter.

According to an example embodiment of the present disclosure, for the SISO system, noise reduction is performed implicitly in combination with the channel shortening filter and VAD estimation.

According to an example embodiment of the present disclosure, for the SISO system, noise reduction is performed implicitly in combination with the channel shortening filter and a set of non-intrusive measures (NIM) including, e.g., reverberation time ("T60"), clarity index ("C50"), direct-to-reverberant ratio (DRR), and signal-to-noise ratio (SNR).

DETAILED DESCRIPTION

Figure 1A:
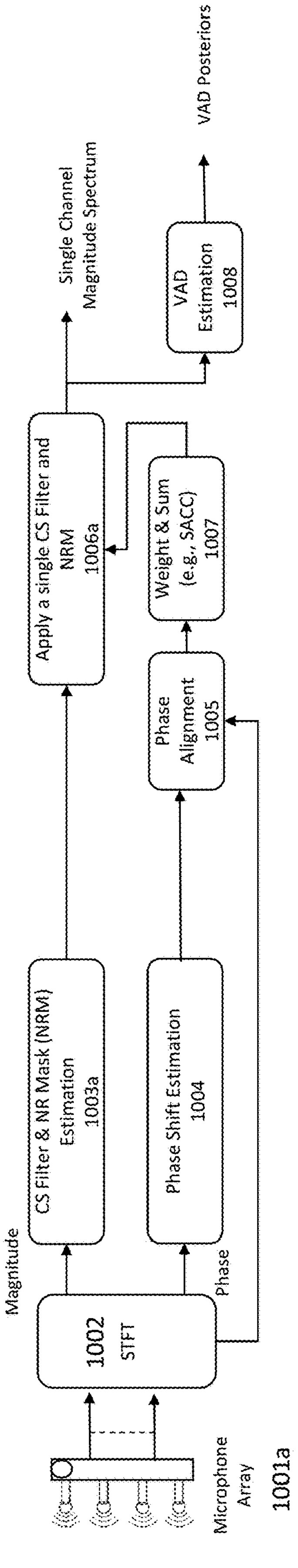
FIG. 1*a* illustrates an architecture of an example embodiment for optimizing a multi-channel input, single-channel output (MISO) system.

FIG. 1*a* illustrates an architecture of an example embodiment for optimizing a multi-channel input, single-channel output (MISO) system, which performs channel shortening (CS)-based de-reverberation, mask-based noise reduction, and delay-and-sum beamforming jointly. As shown in FIG. 1*a*, the output from the microphone array 1001*a* is fed into a short-time Fourier transform (STFT) block 1002 to generate respective STFT outputs. In ASR, the speech is processed frame-wise using a temporal window duration of 20-40 ms, and the STFT is used for the signal analysis of each frame (these STFT frames can be arranged into context frames). The magnitude output of the STFT block 1002 is fed to the channel shortening (CS) filter and NR mask (NRM) estimation block 1003*a*, and the phase output of the STFT block 1002 is fed to the phase shift estimation block 1004 and the phase alignment block 1005. The processing in the CS filter and NRM estimation block 1003*a* can proceed in parallel with the processing in the phase shift estimation block 1004, for example. The CS filter and NRM estimation block 1003*a* utilizes information from the spectra of all (e.g., "M") channel inputs to configure a single CS filter and one NRM. The phase shift estimation block 1004 estimates the phase shift of all (e.g., "M") microphone channel inputs. The output of the phase shift estimation block 1004 is fed to the phase alignment block 1005, which aligns the phase of all the channel inputs.

Continuing with FIG. 1*a*, the output of the phase alignment block 1005 is fed to the weight-and-sum block 1007, which can perform a weighted delay-and-sum beamforming, e.g., Self-Attention Channel Combinator (SACC). The output of the weight-and-sum block is a single channel STFT spectrum. The output of the weight-and-sum block 1007 is fed to the block 1006*a*, in which a single channel shortening (CS) filter and, optionally, a single noise-reduction mask (NRM) can be applied to the output of the weight-and-sum operation. More specifically, in the block 1006*a*, the CS filter is multiplied the by the single channel STFT spectrum to obtain the final representation of the spectrum. For the sake of simplicity, the example embodiment shown in FIG. 1*a* assumes that the multiplication is only in the magnitude domain, and the output of the block 1006*a* is a single channel magnitude spectrum. The single channel magnitude spectrum output of the block 1006*a* is fed to a voice activity detection (VAD) estimation block 1008, which detects VAD "posteriors". VAD is defined as the problem of separating a target speech sound from interfering sounds, e.g., "posteriors" of silence, laughter and noise, which represent non-speech sound. It should be noted that VAD posteriors are a subset of non-intrusive measures (NIM), and the VAD estimation block 1008 can be viewed as a type of NIM estimation block.

Figure 1B:
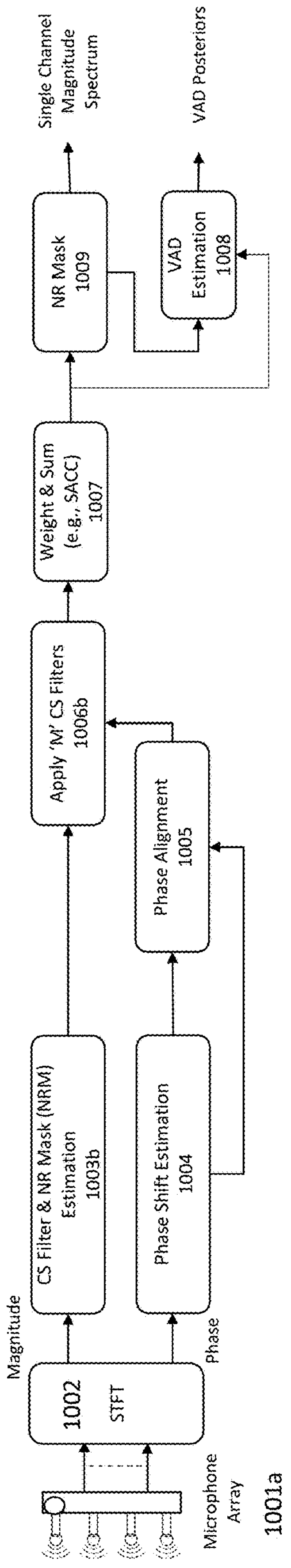
FIG. 1*b* illustrates an architecture of another example embodiment for optimizing a multi-channel input, single-channel output (MISO) system.

FIG. 1*b* illustrates an architecture of another example embodiment for optimizing a multi-channel input, single-channel output (MISO) system, which performs channel shortening (CS)-based de-reverberation, delay-and-sum beamforming, and mask-based noise reduction jointly. In the example embodiment shown in FIG. 1*b*, the output from the microphone array 1001*a* is fed into a short-time Fourier transform (STFT) block 1002 to generate respective STFT outputs. The magnitude output of the STFT block 1002 is fed to the channel shortening (CS) filter and NR mask (NRM) estimation block 1003*b*, and the phase output of the STFT block 1002 is fed to the phase shift estimation block 1004. The processing in the CS filter and NRM estimation block 1003*b* can proceed in parallel with the processing in the phase shift estimation block 1004, for example. The CS filter and NRM estimation block 1003*b* utilizes information from the spectra of all (e.g., "M") channel inputs to configure corresponding "M" number of CS filters and one NRM. The phase shift estimation block 1004 estimates the phase shift of all (e.g., "M") microphone channel inputs. The output of the phase shift estimation block 1004 is fed to the phase alignment block 1005, which aligns the phase of all the channel inputs. The output of the phase alignment is M STFT spectra whose phase components have been aligned.

Continuing with FIG. 1*b*, the output of the phase alignment block 1005 is fed to the block 1006*b*, in which M number of CS filters can be applied, i.e., the M STFT spectra are multiplied by the M CS filters to generate corresponding M output signals from the block 1006*b*. For the sake of simplicity, the example embodiment shown in FIG. 1*b* assumes that the multiplication is only in the magnitude domain. The application of the M CS filters, in one example embodiment, can be approximated by a number of frame-wise convolutions. The M output signals from the block 1006*b* are fed to the weight-and-sum block 1007, which can perform a weighted delay-and-sum beamforming, e.g., Self-Attention Channel Combinator (SACC). The output of the weight-and-sum block, which is a single channel STFT spectrum, can be fed to: i) the NR Mask block 1009, in which a single noise-reduction mask (NRM) can be applied to produce a single channel magnitude spectrum; and ii) a voice activity detection (VAD) estimation block 1008. The single channel magnitude spectrum output of the block 1009 is fed to the VAD estimation block 1008, which detects VAD "posteriors".

For the example MISO systems shown in FIGS. 1*a* and 1*b*, some additional processing for online mode of operation can be performed, as follows:

i) start with, e.g., 90 degrees look direction for the beamformer component;

ii) compute Time Difference Of Arrivals (TDOAs) between a reference microphone and all other microphones;

iii) at each succeeding frame, decide if the system should steer or keep to a previous frame based on heuristics or a neural estimation component; and iv) multiple beams can be provided in such systems (i.e., multiple beamformer components can be provided).

Figure 2A:
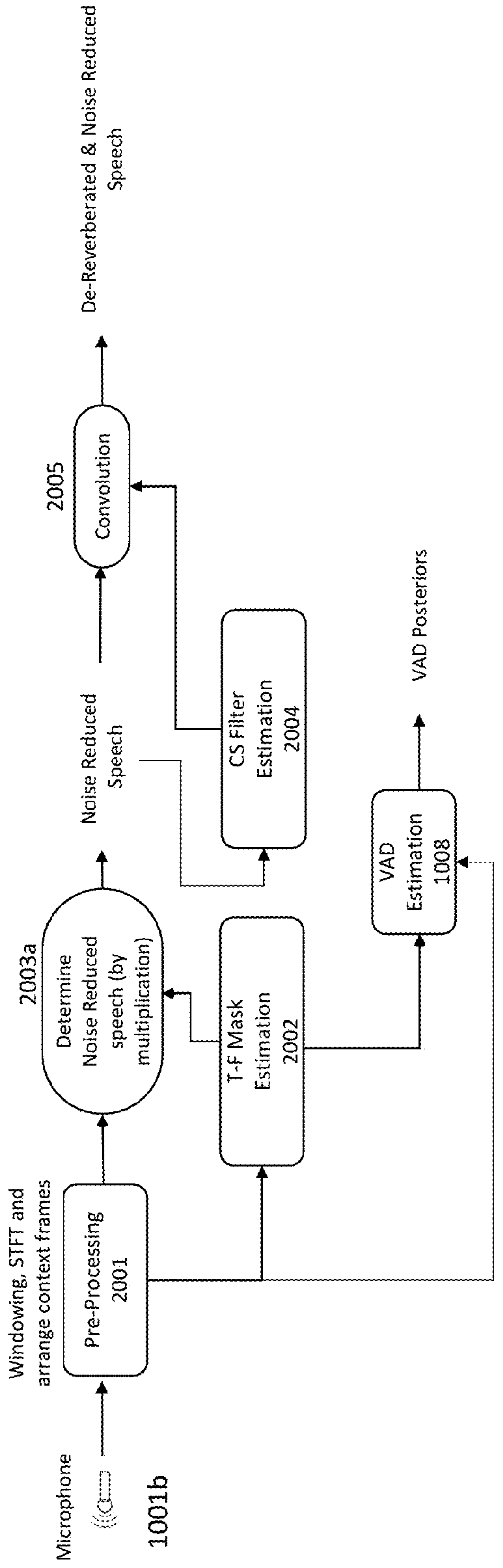
FIG. 2*a* illustrates an architecture of another example embodiment for optimizing a single-channel input, single-channel output (SISO) system.

FIG. 2*a* shows an architecture of an example embodiment for optimizing a single-channel input, single-channel output (SISO) system, which performs optimization of channel shortening (CS)-based de-reverberation and mask-based noise reduction jointly. In this example embodiment, de-reverberation is performed in the form of channel shortening (CS), which provides better performance than statistical methods in the single channel case, and does not introduce artifacts as seen in other neural implementations, due to the CS being filter-based rather than mapping-based. The CS filtering is performed through frequency domain convolution, which approximates frequency domain multiplication. In addition, in this example embodiment, a time-frequency (T-F) mask estimation is optimized jointly with the CS filter estimation. More specifically, a ratio mask is estimated for each time-frequency bin, which mask is then applied to (i.e., multiplication) frequency representation of the speech. Applying the T-F mask, the estimated speech areas are passed through and estimated non-speech areas are attenuated, resulting in noise reduction. Furthermore, because the T-F mask is estimated (generated) explicitly in this example embodiment, voice activity detection (VAD) estimated from the T-F mask can be used to determine the amount of speech present in a context window, and VAD posteriors can be estimated. The VAD information is useful for deciding how speech sections are processed after the CS filter estimation phase, since low speech regions can lead to generation of inaccurate filters, e.g., can erroneously fall back to a filter generated by previous high speech regions.

As shown in FIG. 2*a*, the output from the microphone 1001*b* is fed into a pre-processing block 2001, which performs the following: windowing; STFT; and arranging context frames. The output of the pre-processing block 2001 is fed to: i) the block 2003*a* for determining the noise-reduced speech signal; ii) time-frequency (T-F) mask estimation block 2002; and iii) VAD estimation block 1008. In the block 2002, T-F mask estimation is performed, i.e., a ratio mask is estimated for each time-frequency bin. The output of the T-F mask estimation block 2002 is fed to: i) the block 2003*a* for determining the noise-reduced speech signal; and ii) VAD estimation block 1008. Working in the magnitude power spectra, the signal model for representing the noisy and reverberant speech Y (e.g., output of the pre-processing block 2001) can be expressed as Y=XR+N, where X represents clean speech's STFT, R represents reverberation (i.e., room impulse response's (RIR) STFT), and N represents noise STFT. In the example embodiment of FIG. 2*a*, noise reduction is performed explicitly in block 2003*a* to generate the noise-reduced, reverberant-only signal ($Y_{REV}$) before performing channel shortening in block 2005. Rearranging the expression Y=XR+N, the following expression for the clean signal X can be derived:

$$Y=XR+N$$

$$Y-N=XR=Y_{REV}$$

$$Y_{REV}=YM,\text{ where } M=1-N/Y$$

$$X=Y_{REV}/R$$

In the example embodiment of FIG. 2*a*, in place of subtracting the noise N, we reformulate the problem as a multiplication (i.e., the processing occurring in block 2003*a*) with a gain function estimated by the T-F mask, which generates the noise-reduced (or de-noised) speech signal $Y_{REV}$. Furthermore, in this example embodiment, the frequency domain multiplication (XR) is approximated as a frequency domain convolution (conv(X, R)) using the convolutive transfer function (CTF), which allows for more time domain information to be incorporated into the evaluation. This example embodiment has the advantage of being able to include a dedicated noise-reduction loss term to allow for weighting (balancing) between the channel shortening (de-reverberation) and noise reduction performance.

Continuing with FIG. 2*a*, the noise-reduced (or de-noised) speech signal $Y_{REV}$ is fed into the CS filter estimation block 2004, which in turn generates the CS filter as output. It should be noted that the CS filter and the T-F mask are estimated as part of a joint optimization process, i.e., although they are not estimated in a single step, the CS filter and the T-F mask are trained jointly. In the example embodiment of FIG. 2*a*, first the T-F mask is estimated and applied to the pre-processed data, and then the CS filter is estimated and applied, as explained in further detail below. When optimizing the CS filter and the T-F mask (which can be implemented as neural networks), they are able to learn in tandem and thereby adjust to each other. The CS filter is estimated to a selected shortening target, e.g., a shortening target of 50 ms (i.e., keep first 50 ms of an RIR and shorten the rest), and T-F mask is estimated to target a signal-to-noise ratio (SNR) of 30 dB (for example) for noise reduction. In this case, the CS filter is designed such that the T-F mask applied speech, when convolved with the CS filter, results in speech that is close to the channel-shortened and noise-reduced target (i.e., clean speech+30 dB SNR, convolved with RIR shortened to 50 ms). As shown in FIG. 2*a*, the CS filter output from the block 2004 is fed into the block 2005, which uses the CS filter and the CTF on the noise-reduced speech signal $Y_{REV}$ to generate de-reverberated and noise-reduced speech signal, i.e., clean speech signal X. In addition, in block 1008, the output of the T-F mask estimation block 2002 and the output of the pre-processing block 2001 are used to identify VAD posteriors.

Figure 2B:
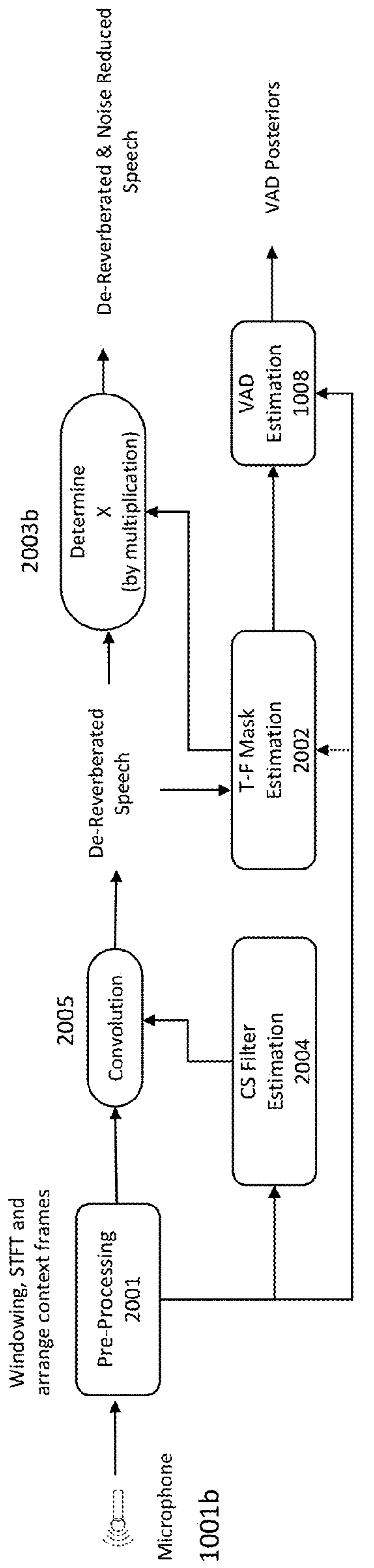
FIG. 2*b* illustrates an architecture of another example embodiment for optimizing a single-channel input, single-channel output (SISO) system.

FIG. 2*b* shows an architecture of an example embodiment for optimizing a single-channel input, single-channel output (SISO) system, which performs optimization of channel shortening (CS)-based de-reverberation and mask-based noise reduction jointly. In this example embodiment, as in the embodiment shown in FIG. 2*a*, de-reverberation is performed in the form of channel shortening (CS); the CS filtering is performed through frequency domain convolution, which approximates frequency domain multiplication; and a time-frequency (T-F) mask estimation is optimized jointly with the CS filter estimation. The example embodiment shown in FIG. 2*b* differs from the embodiment shown in FIG. 2*a* in that: i) the sequential positions of the CS filter estimation block 2004 and the T-F mask estimation block 2002 are interchanged; ii) the sequential order of noise-reduction and de-reverberation is reversed; and iii) the signal model can be expressed differently. Other than these differences, the description provided in connection with FIG. 2*a* applies equally to the example embodiment shown in FIG. 2*b*, unless explicitly stated otherwise.

As shown in FIG. 2*b*, the output from the microphone 1001*b* is fed into a pre-processing block 2001, which performs the following: windowing; STFT; and arranging context frames. The output of the pre-processing block 2001 is fed to: i) the CS filter estimation block 2004; ii) the convolution block 2005; iii) VAD estimation block 1008; and optionally iv) the T-F mask estimation block 2002. The CS filter generated by the CS filter estimation block 2004 is fed into the convolution block 2005, which in turn produces the de-reverberated speech signal. The de-reverberated speech signal is fed into the T-F mask estimation block 2002 and block 2003*b* for determining (by multiplication) the de-reverberated and noise-reduced speech. Working in the magnitude power spectra, the signal model for representing the noisy and reverberant speech Y (e.g., output of the pre-processing block 2001) can be expressed as Y=XR+N, where X represents clean speech's STFT, R represents reverberation (i.e., room impulse response's (RIR) STFT), and N represents noise STFT. In the example embodiment of FIG. 2*b*, noise reduction is performed explicitly in block 2003*b* after the de-reverberation (i.e., applying CS filter) in block 2005, to generate the noise-reduced, de-reverberated signal X (i.e., clean signal). Rearranging the expression Y=XR+N, the following expression for the clean signal X can be derived:

$$Y=XR+N$$

$$Y_{NOISY}=Y/R$$

$$X=Y_{NOISY}-N/R$$

$$X=Y_{NOISY}M, \text{ where } M=1-N/(Y_{NOISY}R)$$

Continuing with FIG. 2*b*, the de-reverberated and noisy speech signal $Y_{NOISY}$ from the block 2005 is fed into the T-F estimation block 2002, which in turn generates T-F mask as output. As in the example embodiment of FIG. 2*a*, the CS filter and the T-F mask are estimated as part of a joint optimization process, i.e., although they are not estimated in a single step, the CS filter and the T-F mask are trained jointly. As shown in FIG. 2*b*, the T-F mask output from the block 2002 is fed into the block 2003*b*, which applies the T-F mask (e.g., by performing complex multiplication) on the de-reverberated and noisy speech signal $Y_{NOISY}$ to generate de-reverberated and noise-reduced speech signal, i.e., clean speech signal X. In addition, in block 1008, the output of the T-F mask estimation block 2002 and the output of the pre-processing block 2001 are used to identify VAD posteriors. As with the example embodiment of FIG. 2*a*, the embodiment shown in FIG. 2*b* has the advantage of being able to include a dedicated noise-reduction loss term to allow for weighting (balancing) between the channel shortening (de-reverberation) and noise reduction performance.

Figure 2C:
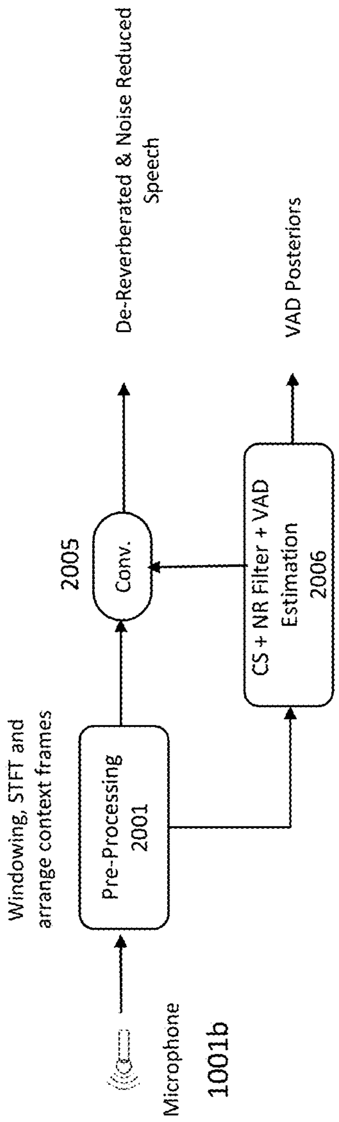
FIG. 2*c* illustrates an architecture of another example embodiment for optimizing a single-channel input, single-channel output (SISO) system.

FIG. 2*c* shows an architecture of an example embodiment for optimizing a single-channel input, single-channel output (SISO) system, which performs noise reduction implicitly in combination with the channel shortening filter along with the VAD estimation. The multiplicative factors for channel shortening and noise reduction are estimated jointly as one filter. The example embodiment shown in FIG. 2*c* only learns through mean square error (MSE) loss between the network output and the labels, and cannot tradeoff between performance for de-reverberation and noise reduction, but this example embodiment requires no extraneous network architectures or loss parameters.

As shown in FIG. 2*c*, the output from the microphone 1001*b* is fed into a pre-processing block 2001, which performs the following: windowing; STFT; and arranging context frames. The output of the pre-processing block 2001 is fed to: i) the CS and noise-reduction (NR) filter and VAD estimation block 2006; and ii) the convolution block 2005. The CS and NR filter generated by the block 2006 is fed into the convolution block 2005, which in turn produces the de-reverberated and noise-reduced speech signal. The block 2006 also performs VAD estimation to identify VAD posteriors.

Figure 2D:
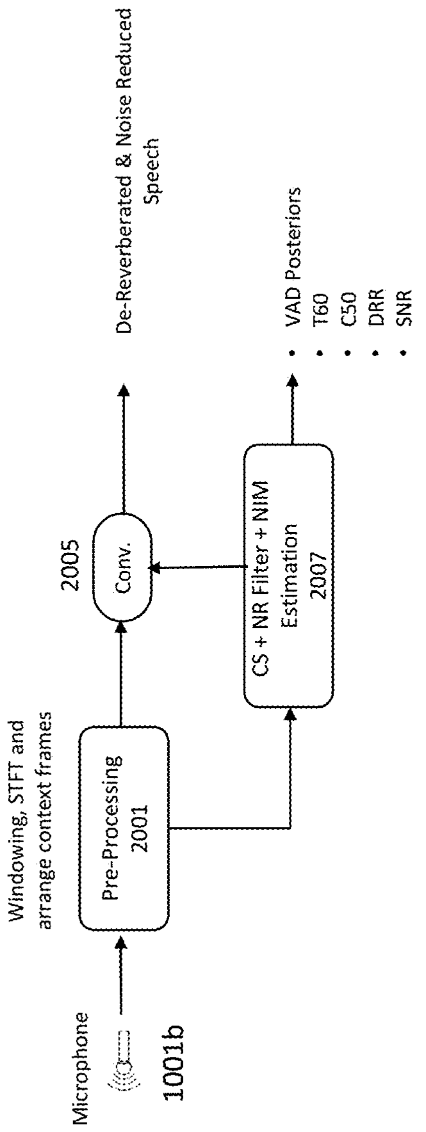
FIG. 2*d* illustrates an architecture of another example embodiment for optimizing a single-channel input, single-channel output (SISO) system.

FIG. 2*d* shows an architecture of an example embodiment for optimizing a single-channel input, single-channel output (SISO) system, which performs noise reduction implicitly in combination with the channel shortening filter along with non-intrusive measures (NIM) estimation, which can include, e.g., VAD posteriors, reverberation time, clarity index, direct-to-reverberant ratio, and signal-to-noise ratio. The example embodiment shown in FIG. 2*d* substantially corresponds to the example embodiment shown in FIG. 2*c*, with the difference that non-intrusive measures (NIM) estimation is performed instead of solely VAD estimation.

As shown in FIG. 2*d*, the output from the microphone 1001*b* is fed into a pre-processing block 2001, which performs the following: windowing; STFT; and arranging context frames. The output of the pre-processing block 2001 is fed to: i) the CS and noise-reduction (NR) filter and non-intrusive measures (NIM) estimation block 2007; and ii) the convolution block 2005. The CS and NR filter generated by the block 2006 is fed into the convolution block 2005, which in turn produces the de-reverberated and noise-reduced speech signal. The block 2006 also performs non-intrusive measures (NIM) estimation to identify, e.g., VAD posteriors, reverberation time ("T60"), clarity index ("C50"), direct-to-reverberant ratio (DRR), and signal-to-noise ratio (SNR).

The present disclosure provides several embodiments of an architecture for jointly optimizing at least de-reverberation and noise reduction. In the case of multiple microphone input, the example embodiments provide an improvement over the known convolutional beamformers by enabling full optimization for, e.g., an ASR application. This is possible due to the neural network structure employed for the de-reverberation and noise reduction front end components, allowing for end-to-end optimization (e.g., with a WER loss component). In addition, the disclosed example embodiments for jointly optimizing de-reverberation and de-noising differ from the known approaches in that the disclosed example embodiments utilize a channel shortening system model as opposed to an MVDR/WPE system model, for example. Moreover, the disclosed example embodiments utilize a delay-and-sum structure for beamforming, instead of the MVDR or minimum power distortion-less response (MPDR) filter and sum structure for beamforming.

Similarly, in the case of a single microphone input, the example embodiments provide an improvement over the known approaches by providing a novel structure of channel shortening and mask estimation for jointly performing de-reverberation and de-noising with criteria for fully optimizing, e.g., ASR. In addition, the VAD estimation is performed jointly with the optimization process, which incorporation of the VAD estimation is important to allow the system to respond to non-speech regions (i.e., trying to perform de-reverberation in non-speech regions can result in unwanted artifacts).

The present disclosure provides a first example of a method of performing at least de-reverberation and noise-reduction of an input sound signal of at least one input channel, comprising: performing, using at least one filter element, at least one of de-reverberation and noise-reduction of the input sound signal to generate a clean output sound signal; and determining, by a non-intrusive measure (NIM) estimation element, at least one non-intrusive measure (NIM) from the sound signal, wherein the at least one NIM includes at least one of voice activity detection (VAD) posterior, reverberation time, clarity index, direct-to-reverberant ratio (DRR), and signal-to-noise ratio (SNR); wherein the de-reverberation is achieved by applying at least one channel shortening (CS) filter component of the at least one filter element.

The present disclosure provides a second example method based on the above-discussed first example method, in which second example method: the noise reduction is performed in combination with the de-reverberation by the channel shortening (CS) filter component; and the de-reverberation is achieved by applying the at least one channel shortening (CS) filter component of the at least one filter element in conjunction with the at least one NIM.

The present disclosure provides a third example method based on the above-discussed first example method, in which third example method: a VAD estimation element is used as the NIM estimation element, and the VAD posterior is used as the at least one NIM.

The present disclosure provides a fourth example method based on the above-discussed first example method, the fourth example method further comprising: estimating a time-frequency (T-F) mask based on one of the input sound signal or a sound signal derived from the input sound signal, and wherein the noise-reduction is achieved by applying the T-F mask.

The present disclosure provides a fifth example method based on the above-discussed fourth example method, in which fourth example method the at least one CS filter component and the T-F mask are optimized jointly.

The present disclosure provides a sixth example method based on the above-discussed fourth example method, in which fourth example method a noise-reduced sound signal is produced by applying the T-F mask, and wherein the at least one CS filter component is applied to the noise-reduced sound signal to achieve de-reverberation and produce a clean output signal.

The present disclosure provides a seventh example method based on the above-discussed fourth example method, in which fourth example method the at least one CS filter component is applied to the input sound signal to produce de-reverberated sound signal; and the T-F mask is applied to the de-reverberated sound signal to achieve noise-reduction and produce a clean output signal.

The present disclosure provides an eighth example method based on the above-discussed first example method, in which eighth example method multiple input channels are provided for capturing multiple input sound signals, the eighth example method further comprising: performing, by a phase alignment module, phase alignment of the multiple input sound signals to produce phase-aligned multiple sound signals.

The present disclosure provides a ninth example method based on the above-discussed eighth example method, the ninth example method further comprising: performing, by a weight-and-sum module, a weighted delay-and-sum beamforming of the phase-aligned multiple sound signals to produce a beamformed signal; wherein at least one of i) a single filter element is applied to perform at least one of de-reverberation and noise-reduction of the beamformed signal to produce the clean output sound signal, and ii) at least one voice activity detection (VAD) posterior is determined based on the clean output sound signal.

The present disclosure provides a tenth example method based on the above-discussed eighth example method, in which tenth example method multiple CS filter components and a single noise-reduction mask are provided, the tenth example method further comprising: applying the multiple CS filter components to the phase-aligned multiple sound signals to produce de-reverberated multiple sound signals; performing, by a weight-and-sum module, a weighted delay-and-sum beamforming of the de-reverberated multiple sound signals to produce a beamformed signal; and at least one of i) applying the single noise-reduction mask to the beamformed signal to produce the clean output sound signal, and ii) at least one voice activity detection (VAD) posterior is determined based at least in part on the clean output sound signal.

The present disclosure provides a first example system for performing at least de-reverberation and noise-reduction of an input sound signal of at least one input channel, comprising: at least one filter element configured to perform at least one of de-reverberation and noise-reduction of the input sound signal to generate a clean output sound signal; and a non-intrusive measure (NIM) estimation element configured to perform at least one non-intrusive measure (NIM) from the sound signal, wherein the at least one NIM includes at least one of voice activity detection (VAD) posterior, reverberation time, clarity index, direct-to-reverberant ratio (DRR), and signal-to-noise ratio (SNR); wherein the de-reverberation is achieved by applying at least one channel shortening (CS) filter component of the at least one filter element.

The present disclosure provides a second example system based on the above-discussed first example system, in which second example system: the noise reduction is performed in combination with the de-reverberation by the channel shortening (CS) filter component; and the de-reverberation is achieved by applying the at least one channel shortening (CS) filter component of the at least one filter element in conjunction with the at least one NIM.

The present disclosure provides a third example system based on the above-discussed first example system, in which third example system a VAD estimation element is used as the NIM estimation element, and the VAD posterior is used as the at least one NIM.

The present disclosure provides a fourth example system based on the above-discussed first example system, in which fourth example system a time-frequency (T-F) mask is estimated based on one of the input sound signal or a sound signal derived from the input sound signal, and the noise-reduction is achieved by applying the T-F mask.

The present disclosure provides a fifth example system based on the above-discussed fourth example system, in which fifth example system the at least one CS filter component and the T-F mask are optimized jointly.

The present disclosure provides a sixth example system based on the above-discussed fourth example system, in which sixth example system a noise-reduced sound signal is produced by applying the T-F mask, and the at least one CS filter component is applied to the noise-reduced sound signal to achieve de-reverberation and produce a clean output signal.

The present disclosure provides a seventh example system based on the above-discussed fourth example system, in which seventh example system: the at least one CS filter component is applied to the input sound signal to produce de-reverberated sound signal; and the T-F mask is applied to the de-reverberated sound signal to achieve noise-reduction and produce a clean output signal.

The present disclosure provides an eighth example system based on the above-discussed first example system, in which eighth example system multiple input channels are provided for capturing multiple input sound signals, the eighth example system further comprising: a phase alignment module configured to perform phase alignment of the multiple input sound signals to produce phase-aligned multiple sound signals.

The present disclosure provides a ninth example system based on the above-discussed eighth example system, the ninth example system further comprising: a weight-and-sum module configured to perform a weighted delay-and-sum beamforming of the phase-aligned multiple sound signals to produce a beamformed signal; wherein at least one of i) a single filter element is applied to perform at least one of de-reverberation and noise-reduction of the beamformed signal to produce the clean output sound signal, and ii) at least one voice activity detection (VAD) posterior is determined based on the clean output sound signal.

The present disclosure provides a tenth example system based on the above-discussed eighth example system, the tenth example system further comprising: a weight-and-sum module configured to perform a weighted delay-and-sum beamforming; wherein multiple CS filter components and a single noise-reduction mask are provided; the multiple CS filter components are applied to the phase-aligned multiple sound signals to produce de-reverberated multiple sound signals; the weight-and-sum module performs a weighted delay-and-sum beamforming of the de-reverberated multiple sound signals to produce a beamformed signal; and at least one of i) the single noise-reduction mask is applied to the beamformed signal to produce the clean output sound signal, and ii) at least one voice activity detection (VAD) posterior is determined based at least in part on the clean output sound signal.

What is claimed is:

1. A method of performing at least de-reverberation and noise-reduction of an input sound signal of at least one input channel, comprising:

performing, using at least one filter element, de-reverberation and noise-reduction of the input sound signal to generate a clean output sound signal;

estimating a time-frequency (T-F) mask based on one of the input sound signal or a sound signal derived from the input sound signal, wherein the noise-reduction is achieved by applying the T-F mask; and determining, by a non-intrusive measure (NIM) estimation element, at least one non-intrusive measure (NIM) from the sound signal, wherein the at least one NIM includes at least one of voice activity detection (VAD) posterior, reverberation time, clarity index, direct-to-reverberant ratio (DRR), and signal-to-noise ratio (SNR);

wherein the de-reverberation is achieved by applying at least one channel shortening (CS) filter component of the at least one filter element, and wherein the at least one CS filter component and the T-F mask are trained jointly and adjust to each other.

2. The method according to claim 1, wherein:

the noise reduction is performed in combination with the de-reverberation by the channel shortening (CS) filter component; and the de-reverberation is achieved by applying the at least one channel shortening (CS) filter component of the at least one filter element in conjunction with the at least one NIM.

3. The method according to claim 1, wherein a VAD estimation element is used as the NIM estimation element, and the VAD posterior is used as the at least one NIM.

4. The method according to claim 1, wherein the CS filter component is estimated to a selected shortening target.

5. The method according to claim 1, wherein the T-F mask is estimated to a signal-to-noise ratio (SNR) target.

6. The method according to claim 4, wherein a noise-reduced sound signal is produced by applying the T-F mask, and wherein the at least one CS filter component is applied to the noise-reduced sound signal to achieve de-reverberation and produce a clean output signal.

7. The method according to claim 4, wherein:

the at least one CS filter component is applied to the input sound signal to produce de-reverberated sound signal; and the T-F mask is applied to the de-reverberated sound signal to achieve noise-reduction and produce a clean output signal.

8. The method according to claim 1, wherein multiple input channels are provided for capturing multiple input sound signals, the method further comprising:

performing, by a phase alignment module, phase alignment of the multiple input sound signals to produce phase-aligned multiple sound signals.

9. The method according to claim 8, further comprising:

performing, by a weight-and-sum module, a weighted delay-and-sum beamforming of the phase-aligned multiple sound signals to produce a beamformed signal;

wherein at least one of i) a single filter element is applied to perform at least one of de-reverberation and noise-reduction of the beamformed signal to produce the clean output sound signal, and ii) at least one voice activity detection (VAD) posterior is determined based on the clean output sound signal.

10. The method according to claim 8, wherein multiple CS filter components and a single noise-reduction mask are provided, the method further comprising:

applying the multiple CS filter components to the phase-aligned multiple sound signals to produce de-reverberated multiple sound signals;

performing, by a weight-and-sum module, a weighted delay-and-sum beamforming of the de-reverberated multiple sound signals to produce a beamformed signal; and at least one of i) applying the single noise-reduction mask to the beamformed signal to produce the clean output sound signal, and ii) at least one voice activity detection (VAD) posterior is determined based at least in part on the clean output sound signal.

11. A system for performing at least de-reverberation and noise-reduction of an input sound signal of at least one input channel, comprising:

at least one filter element configured to perform de-reverberation and noise-reduction of the input sound signal to generate a clean output sound signal;

a non-intrusive measure (NIM) estimation element configured to perform at least one non-intrusive measure (NIM) from the sound signal, wherein the at least one NIM includes at least one of voice activity detection (VAD) posterior, reverberation time, clarity index, direct-to-reverberant ratio (DRR), and signal-to-noise ratio (SNR);

wherein the de-reverberation is achieved by applying at least one channel shortening (CS) filter component of the at least one filter element, wherein the noise-reduction is achieved by applying a time-frequency (T-F) mask, the T-F mask estimated based on one of the input sound signal or a sound signal derived from the input sound signal, and wherein the at least one CS filter component and the T-F mask are trained jointly and adjust to each other.

12. The system according to claim 11, wherein:

the noise reduction is performed in combination with the de-reverberation by the channel shortening (CS) filter component; and the de-reverberation is achieved by applying the at least one channel shortening (CS) filter component of the at least one filter element in conjunction with the at least one NIM.

13. The system according to claim 11, wherein a VAD estimation element is used as the NIM estimation element, and the VAD posterior is used as the at least one NIM.

14. The system according to claim 11, wherein:

the CS filter component is estimated to a selected shortening target.

15. The system according to claim 11, wherein the T-F mask is estimated to a signal-to-noise ratio (SNR) target.

16. The system according to claim 14, wherein a noise-reduced sound signal is produced by applying the T-F mask, and wherein the at least one CS filter component is applied to the noise-reduced sound signal to achieve de-reverberation and produce a clean output signal.

17. The system according to claim 14, wherein:

the at least one CS filter component is applied to the input sound signal to produce de-reverberated sound signal; and the T-F mask is applied to the de-reverberated sound signal to achieve noise-reduction and produce a clean output signal.

18. The system according to claim 11, wherein multiple input channels are provided for capturing multiple input sound signals, the system further comprising:

a phase alignment module configured to perform phase alignment of the multiple input sound signals to produce phase-aligned multiple sound signals.

19. The system according to claim 18, further comprising:

a weight-and-sum module configured to perform a weighted delay-and-sum beamforming of the phase-aligned multiple sound signals to produce a beamformed signal;

wherein at least one of i) a single filter element is applied to perform at least one of de-reverberation and noise-reduction of the beamformed signal to produce the clean output sound signal, and ii) at least one voice activity detection (VAD) posterior is determined based on the clean output sound signal.

20. The system according to claim 18, further comprising:

a weight-and-sum module configured to perform a weighted delay-and-sum beamforming;

wherein:

multiple CS filter components and a single noise-reduction mask are provided;

the multiple CS filter components are applied to the phase-aligned multiple sound signals to produce de-reverberated multiple sound signals;

the weight-and-sum module performs a weighted delay-and-sum beamforming of the de-reverberated multiple sound signals to produce a beamformed signal; and at least one of i) the single noise-reduction mask is applied to the beamformed signal to produce the clean output sound signal, and ii) at least one voice activity detection (VAD) posterior is determined based at least in part on the clean output sound signal.

* * * * *